Nov. 1, 1966  
JAMES E. WEBB  
3,282,541  
ADMINISTRATOR OF THE NATIONAL AERONAUTICS  
AND SPACE ADMINISTRATION  
ATTITUDE CONTROL SYSTEM FOR SOUNDING ROCKETS  
Filed Feb. 19, 1965  
3 Sheets-Sheet 1
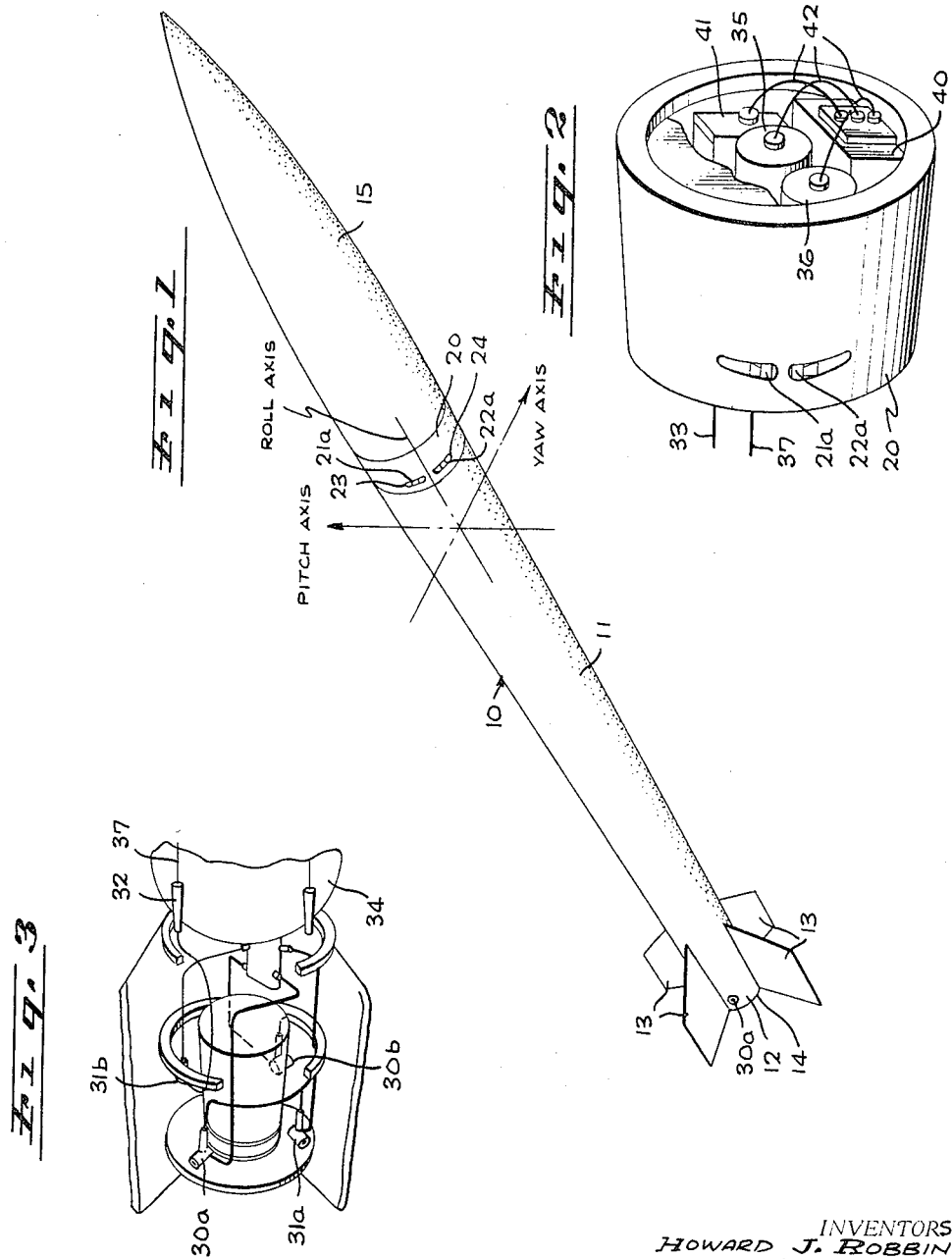
INVENTORS  
HOWARD J. ROBBINS  
ZBIGGIE E. ZEBROWSKI  
BY  
Howard B. Scheckman  
ATTORNEYS

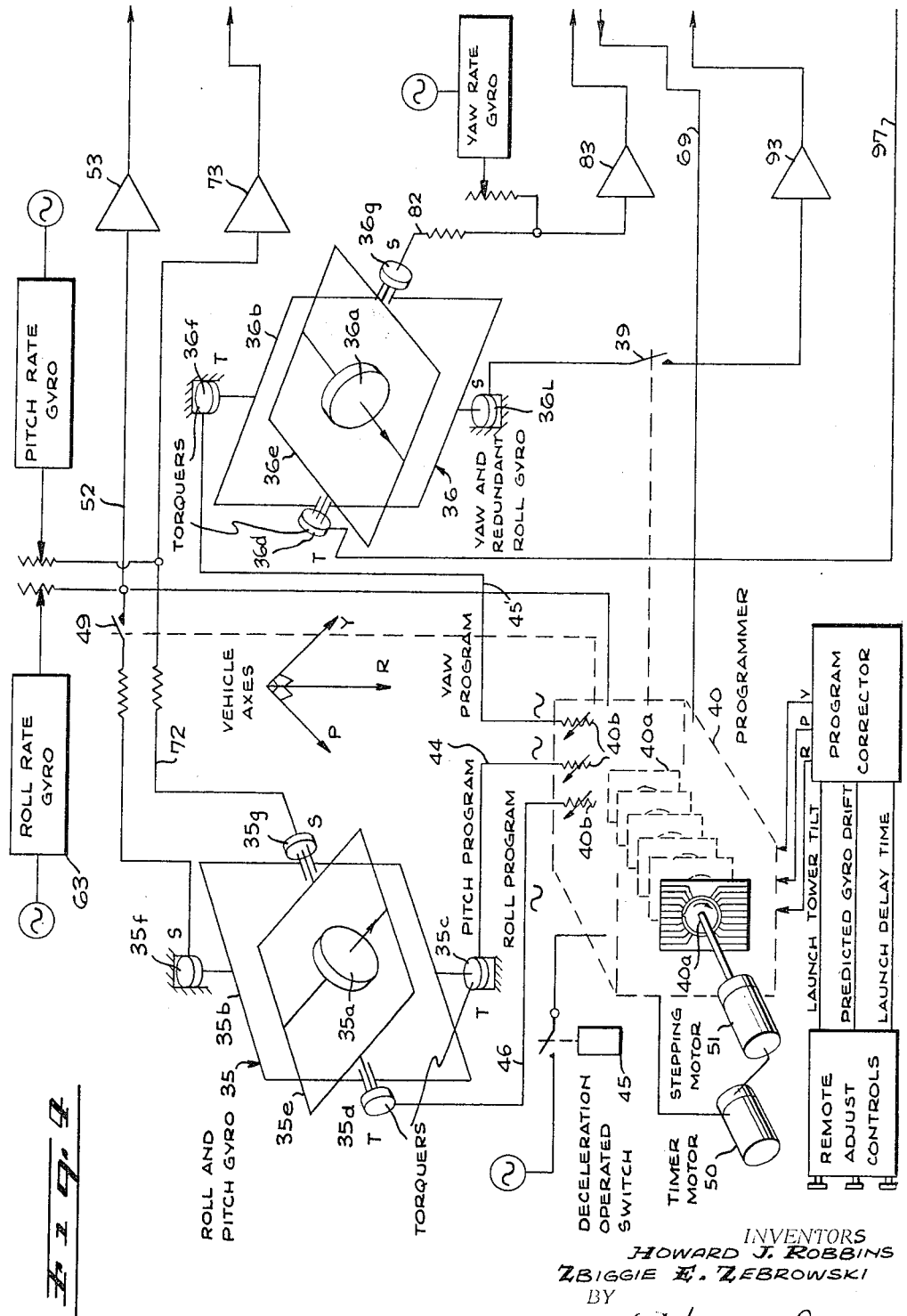

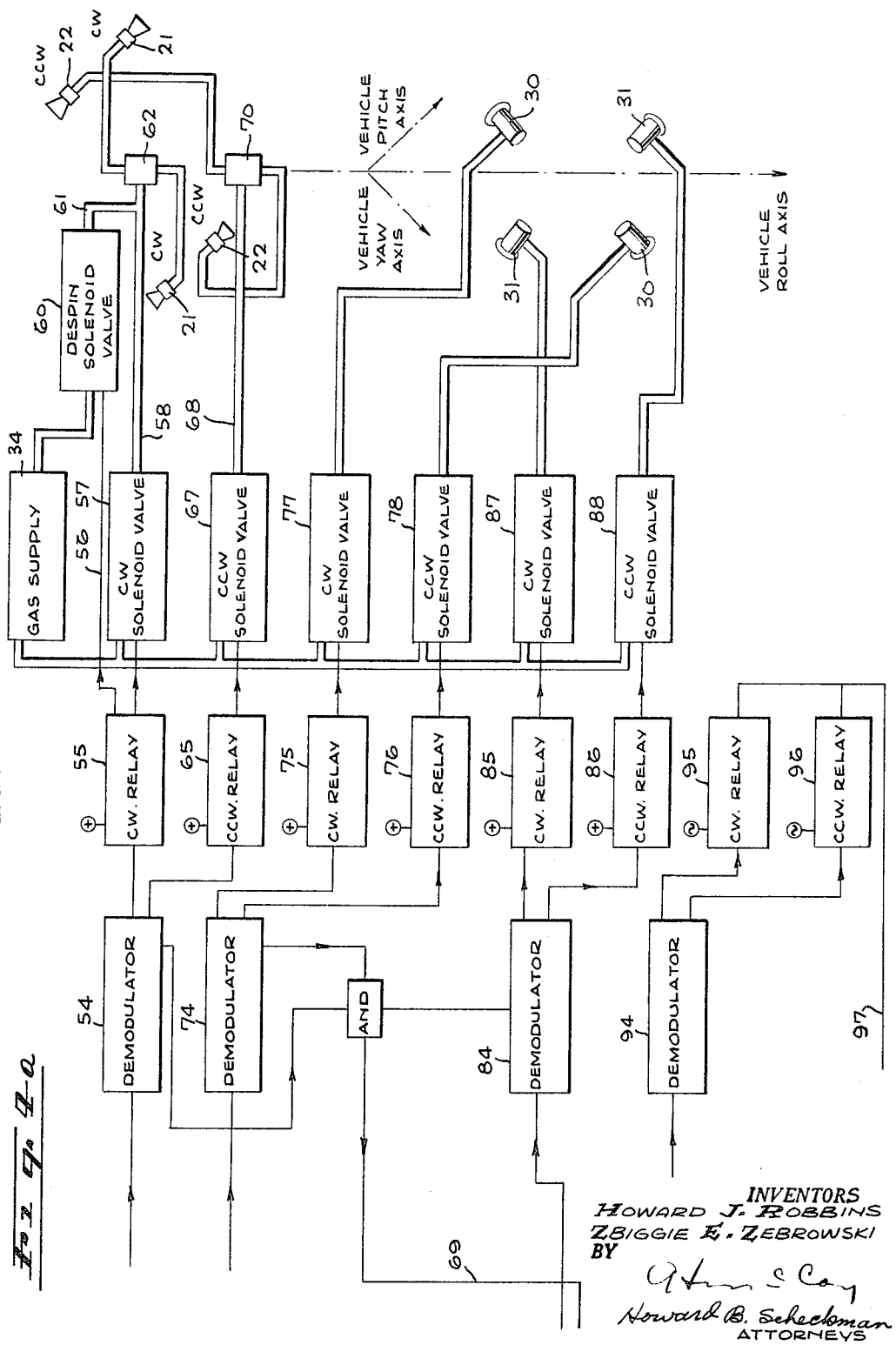

3,282,541
ATTITUDE CONTROL SYSTEM FOR
SOUNDING ROCKETS
James E. Webb, Administrator of the National Aeronautics and Space Administration with respect to an invention of Howard J. Robbins and Zbiggie E. Zebrowski
Filed Feb. 19, 1965, Ser. No. 434,148
9 Claims. (Cl. 102—50)

This invention relates to sounding rockets and more particularly to systems for controlling the attitude of sounding rockets during the ballistic phase of flight.

The spin stabilized sounding rocket has, through recent years, become established as a relatively simple reliable research vehicle for transporting sensors of various types to altitudes well above the sensible atmosphere of the earth. These vehicles allow the researcher to conduct such experiments as celestial spectographic observaitons in the visible, ultraviolet and infrared regions, perform airglow measurements, horizon scanning and radio frequency propagation studies, without interference from the earth's atmosphere. These experiments are normally conducted after launch and powered flight, during the ballistic or coasting phase of the flight before re-entry into the earth's atmosphere; and, these experiments normally require that the sensors be stabilized in a particular inertial direction during the observation period.

Typically, such research vehicles employ spin stabilization during powered flight to avoid the weight and complexities of guidance and control systems common to strategic missiles. As a result of the spinning or coning motion during the coasting phase of flight, the vehicle does not afford a suitable platform for the experiments without some form of vehicle stabilization.

It is, therefore, an object of this invention to provide a simple effective attitude control system for ballistic vehicles.

Another object of this invention is to provide an attitude control system which is light in weight and of minimum size and yet capable of sequentially aligning the vehicle in a number, for example five, of discrete attitudes with precise accuracy during the limited time period of ballistic flight of the vehicle prior to re-entry into the earth's atmosphere.

Basically, the attitude control system of this invention encompasses a vehicle which is launched for powered flight through the earth's atmosphere and a gyroscope control system energized after propulsion system burnout. The heart of the control system is a pair of body mounted free gyroscopes, one for roll and pitch and one for yaw, which "remember" the launch attitude and under the control of a programmer provide a reference attitude in each vehicle-body axis. Errors relative to this reference are detected and employed to maintain on-off control of solenoid-operated cold gas valves in such a manner as to hold such errors to a low value. The roll signal derived from the roll/pitch gyroscope controls two pair of roll-reaction jet nozzles directed to produce either clockwise or counter-clockwise control moments about the roll axis of the vehicle. The pitch signal from the roll/pitch gyroscope and the yaw signal from the yaw gyroscope are each coupled to respective pairs of pitch and yaw reaction jet nozzles installed in the tail assembly of the vehicle and oriented so as to produce either clockwise or counter-clockwise control moments about the pitch and yaw axes, respectively. Rate gyroscopes are employed to sense angular rate about the roll, pitch and yaw axes. Rate gyroscope output signals provide appropriate damping for stabilization; the roll rate gyroscope is also used for detection and removal of the vehicle spin rate.

One feature of this invention resides in the combination of a spin and/or aerodynamically stabilized ballistic vehicle and a gyroscope controlled attitude control system activated upon burnout of the vehicle propulsion system and operative to sequentially orient the vehicle to a number of predetermined positions.

Still another feature of this invention relates to the combination of a timer-controlled programmer plus position and rate gyroscopes to apply corrective signals from the position gyroscopes to the reaction jet nozzles and thereby effect vehicle attitude corrections.

One other feature of this invention resides in the combination of solenoid-controlled valves with the vehicle propellant pressurization gas source for providing attitude control moments for the vehicle.

These and other features of this invention may be more clearly understood from the following detailed description and by reference to the drawing in which:

FIG. 1 is a perspective view of a sounding rocket after launch and booster burnout and entering the coasting phase of a flight;

FIG. 2 is a perspective view, partially broken away, of the attitude control package of the vehicle of FIG. 1;

FIG. 3 is a perspective showing of the fin and tail assembly of the vehicle of FIG. 1 with portions broken away to show the pitch and yaw jet nozzle assembly; and FIGURE 4 and FIGURE 4a are a simplified block diagram of the system of FIGS. 1–3.

Now, referring to FIG. 1 in conjunction with FIGS. 2 and 3, the second stage of a two-stage sounding rocket is shown therein, after launch, separation from the first stage, and burnout of the second stage, in the ballistic portion of the flight at approximately 150,000 feet above the earth.

The sounding rocket or vehicle generally designated 10 comprises a body portion 11 containing propellant storage tanks, an after-end 12 carrying stabilizing fins 13 and enclosing the rocket nozzle assembly 14, best seen in FIG. 3, and a nose cone 15 containing the instrumentation constituting the payload of the vehicle. The rocket 10 is stabilized during powered flight by fins 13 which are permanently canted to produce a spin which continues after burnout of the booster rocket engine and after the vehicle has left the sensible atmosphere. Additionally, the vehicle 10 includes between the body 11 and the nose-cone and palyood section 15, an attitude control section 20 appearing externally simply as an extension of the body 11. The attitude control section 20 contains two pair of roll nozzles 21 and 22 (FIG. 4A) directed tangentially with respect to a circular section normal to the longitudinal or roll axis of the vehicle and positioned in peripheral receses 23 and 24 (FIG. 2) in the skin of the vehicle. Two nozzles 21a (only one being shown in FIG. 2), diametrically positioned, are directed to produce a counter-clockwise reaction moment component upon the vehicle. Viewing the vehicle from the nose end, the second pair of roll nozzles 22a (only one being shown in FIG. 2) are, longitudinally aligned with and backing upon the respective nozzles 21, provide a clockwise reaction force moment about the roll axis upon the ejection of gas from the nozzles.

The physical arrangement of the attitude control system is illustrated in FIGS. 2 and 3. The cylindrical body section 20 of FIG. 2 contains the programming, sensing and electrical control portions of the system, and the roll control nozzles 21 and 22. The remainder of the attitude control system consists of solenoid controlled pitch and yaw valves and nozzles in the after-end of the vehicle and shown in FIG. 3. A pair of pitch nozzles 30a and 30b, one of which is shown in the drawing, are positioned diametrically opposite and orthogonally with respect to the pitch axis. A similar pair of yaw nozzles 31a and 31b are oppositely disposed in the after-end and directed to eject gas in opposite directions orthogonal to the yaw axis of the vehicle. The two sections of the attitude control system, although separated physically by the intermediate body portion 11, are interconnected electrically via cable 37 passing through body duct 32; and, the pitch, yaw and roll nozzles are all connected via appropriate tubing 33 to a gas supply from the propellant pressurization tanks 34 contained within the body portion 11 and shown in part in FIG. 3.

The reference and electrical control elements of the system are shown in their relative positions within the section 20 in FIG. 2. These include two free gyroscopes 35 and 36 secured to a bulkhead unshown in the drawing but extending perpendicular to the longitudinal or roll axis of the vehicle. The gyroscopes 35 and 36 are thereby body mounted but internally freely gimballed (during flight) as is more fully explained in connected with FIG. 4. Associated with the free gyroscopes 35 and 36 in the section 20 are a programmer 40 for sequentially applying torquing signals to the gyroscopes 35 and 36, a control box 41, rate gyroscopes, a power supply and other electrical components of the system.

The details of the system and interrelationship of its component parts are best explained by reference to FIG. 4 in connection with description of the typical operational flight of a sounding rocket incorporating this invention. A sounding rocket is erected in a tower for launching after installation of the payload in the nosecone. The attitude control system section 20 is preprogrammed for the particular experiments to be performed.

One type of targeting, the scanning mode, is achieved where the attitude control system produces a controlled coning of the entire vehicle about the longitudinal axis. This is accomplished in flight by the attitude control system moving the vehicle to the desired cone axis, similar to the vehicle erection process hereinafter described, pitching the vehicle to one-half of the desired cone angle, and simultaneously energizing the roll control circuit so that gyroscopic coupling between the pitch and roll rates produces the desired coning mode. The attitude control system then can be deactivated and the vehicle will precess freely. Sensors carried in the nose are then capable of observing an enlarged field during the free flight and reentry phase of the flight.

A second and more significant type of program, and the one toward which this invention is particularly directed, is designed to position and maintain the vehicle in a spatially fixed orientation for sufficient time to make predetermined observations. In this mode of targeting the vehicle constitutes a stable platform for the senosrs. The attitude control system is required to despin the vehicle, orient it to a reference attitude, and then sequentially position the vehicle in a number of orientations to allow the performance of a number of experiments during free flight period.

In a typical flight sequence, prior to launch, the rotors 35a and 36a of the roll and pitch gyroscope 35 and yaw and redundant roll gyroscope 36, are brought up to operating speed and are caged in the null position until launch at which time they are uncaged. The preflight caging controls and circuitry are omitted in the drawing inasmuch as they are not operated during the normal operational cycle of the attitude control system and, additionally, are conventional and well-known in the art. The axis of the outer gimbal 35b of the roll and pitch gyroscope 35 and the outer gimbal 35b of the yaw and redundant roll gyroscope 36 are permanently aligned with the roll axis of the vehicle. These outer gimbals each include a torquer 35c and 36f respectively, each responding to output voltages on a pitch program lead 44 and a yaw program lead 45' from the programmer 40 to introduce precession torques into the respective gyroscope 35 and 36.

The outer gimbal 35b of gyroscope 35 is free while the outer gimbal 36b of the yaw and redundant roll gyroscope 36 is effectively caged to the vehicle by a feedback loop from the synchro 36g to torquer 36d as hereinafter described.

The programmer 40 is inactive prior to launch except for the introduction of three last-minute corrections into the attitude control system from remote adjust controls at the launch console through the normal umbilical cable of the vehicle. The remote adjustments, all of which take the form of potentiometer adjustments controlling the amplitude and phase of A.C. voltages subsequently applied by the programmer to the torquers of the gyroscopes, are adjustments for the launch tower tilt immediately preceding launch, the predicted gyroscope drift during the power flight, and a further adjustment for unplanned launch delay which, of course, results in slight variations in the predicted position of astronomical bodies sought to be observed.

After the introduction of these last-minute adjustments in the attitude control system, and the uncaging of the gyroscopes 35 and 36, the vehicle is launched for a powered flight which, in the case of the Aerobee 150A vehicle is in the order of 52 seconds, at which time the vehicle reaches approximately 129,000 feet altitude moving at a velocity of the order of 6,300 feet-per-second and having a roll of nominally 2.0 revolutions per second. Upon burnout of the propulsion system, the resultant vehicle deceleration operates a switch 45 to enable the attitude control system by applying power to the programmer 40. The programmer, as illustrated in the drawing, includes a number of ganged switch rotors 40a, each having a single lobe sequentially contacting a number of stator positions corresponding to the number, e.g., 24, of sequential steps of the program and driven in unison by a stepping motor 51.

During powered flight the programmer rotors 40a are in switch position (1) and the attitude control system is inoperative. The application of power to the system steps the motor 51 to the position (2) thereby starting timer motor 50. After operation of the timer motor 50 to step motor 51 to the position (3), the despinning operation is initiated and the timer motor 50 is stopped. The spin rate is sensed by a roll rate gyroscope 63 and the output signal thereof is conducted via an electrical lead 52, amplifier 53, and demodulator 54 to operate a clockwise relay 55 which, in turn through lead 56, operates a despin solenoid valve 60 and the clockwise solenoid valve 57. Switch 49, in the position gyroscope 35 output and under the control of the programmer 40, is open so that rate information alone is applied to the amplifier 53. The despin solenoid valve 60, of larger capacity than the clockwise valve 57 used for normal maneuvers to allow rapid despinning of the vehicle, is connected to the gas supply in tank 34, shown in FIG. 3, and through tubing 61 and manifold 62 allows gas to flow out of the clockwise roll nozzles 21 to despin the vehicle.

The completion of despinning from a nominal two-revolution-per-second rate is normally accomplished in approximately eight seconds. When the roll rate falls to a low value, the absence of a signal from roll rate gyroscope 63 to the amplifier 53 and demodulator 54 causes the clockwise relay 55 to drop out and the despinning solenoid valve 60 is closed and the stepping motor 51 is stepped to the position (4). In this phase of the program the vehicle erects to the uncompensated gyroscope heading. The completion of the vehicle erection step is sensed by the falling of all position gyroscope correction signals to zero or below a predetermined threshold. This is accomplished by feedback from level detection circuits in the demodulators 54, 74 and 84 through an AND gate 59 and lead 69 to the programmer 40. The presence of a signal on lead 69, indicating that all demodulator signals have fallen below a preselected minimum value, results in the advance to position (5) of the stepping motor 51 and restarting of the timer motor 50. Further advance of the stepping motor 51 to positions (6), (7) and (8) by the timer motor 50 allows the programmer 40 to torque the gyroscopes 35 and 36 to slightly modified positions compensating for tower tilt, earth rotation, and gyroscope drift during boost, in accordance with the preset remote control adjustments made prior to launch.

Considering these corrections in more detail, upon the advance of the stepping motor 51 to a rotor position (6), a roll correction voltage is applied via the roll program lead 46 to the torquer 35d to produce a torque of predetermined duration and magnitude to make the roll correction to the gyroscope reference axis. Depending on the direction of precession of the outer gimbal 35b, resulting from the application of roll torque and resultant polarity of the demodulated signal at demodulator 54, either the clockwise relay 55 or the counter-clockwise relay 65 is operated. These are connected to operate a respective clockwise solenoid valve 57 or a counter-clockwise solenoid valve 67. Both the valves 57 and 67 are connected to the gas supply 34 and through feed tubing 58 and 68, respectively, to manifolds 62 and 70, supplying the clockwise roll nozzles 21 and counter-clockwise roll nozzles 22, respectively. When the roll error signal, comprised of the sum of the output signals from synchro 35f and the roll rate gyro, falls to zero the operated solenoid valve 57 or 67 is closed by the dropout of the actuated relay 55 or 65.

After the roll correction period the advance of the stepping motor 51 to the next sequential position (7) allows the application of the pitch correction voltage over lead 44 to the torquer 35c causing appropriate precession of the inner gimbal 35e in turn sensed as the pitch position error signal by the pitch synchro 35g. This pitch position error signal together with the output of the pitch rate gyroscope, conducted through lead 72, amplifier 73 and demodulator 74, operates either the clockwise relay 75 or counter-clockwise relay 76 controlling, respectively, clockwise solenoid valve 77 and counter-clockwise solenoid valve 78. The solenoid valves 77 and 78 are supplied with gas from the common source 34 and feed the respective nozzles 30a and 30b aligned and oppositely directed to pitch the vehicle about the pitch axis to the desired orientation. Similar to the case of roll correction, the falling of the pitch error signal at the pitch synchro 35g and at the pitch rate gyroscope signals the closing of the operated solenoid valves 77 or 78 and the termination of the pitch correction to the predetermined reference.

At the expiration of the pitch correction period and the subsequent stepping of motor 51 to the next sequential position (8) the programmer allows the yaw correction voltage to be introduced into the yaw gyroscope 36 via lead 45 which applies a torque to the torquer 36f. Resulting precession of the inner gimbal is sensed by synchro 36g and introduced via lead 82, amplifier 83, and demodulator 84, to yaw clockwise relay 85 or counter-clockwise relay 86, depending upon the polarity of the error signal. The relays 85 and 86 similarly control solenoid valves 87 and 88 serving to apply reaction gas to the yaw nozzles 31a and 31b.

Throughout these compensation corrections and throughout the programmed maneuvers to follow, the outer gimbal 36b of gyroscope 36 is slaved to the vehicle by the feedback loop from the synchro 36l via switch contacts 39 in the programmer (closed during steps (4)–(24) of the programmer and for clarity shown simply as a switch 39), an amplifier 93, demodulator 94, a pair of relays 95 and 96 and a return lead 97. This gyroscope caging feedback loop maintains the outer gimbal 36b slaved to the vehicle and insures that the inner gimbal axis of gyroscope 36 is held closely aligned to the vehicle yaw axis throughout the maneuvers.

The above steps relate the sequential operations for despinning the spin stabilized vehicle and orienting the vehicle to a preassigned reference by maneuvers in roll, pitch and yaw in that order.

The sequence of steps for astronomical observations is next initiated and this is accomplished in the same general manner as achieving the reference orientation and compensation. First, after a delay, position (9), the vehicle is rolled until its yaw plane intercepts the first target, e.g. a star. The first such maneuver is accomplished during sequential step (10) of the stepping motor 51 depending upon the preset program. The vehicle is then yawed in sequential step (11) similarly until it points at the target subsequent to which time the experiment is conducted or observation made during sequential step (12).

After the passage of the number one observation period, position (12), the next advance of the stepping motor to positions (13) and (14) under control of the timer motor 50 produces the attitude corrections for the second observation which occurs in position (15). Each of the maneuvers necessary to re-orient the vehicle to the subsequent intended orientations is accomplished by the programmer by torquing the appropriate gyroscope gimbal at a precise rate determined by current limiting resistors in the programmer for a precise time interval as determined by the timer motor 50.

A complete sequence of the observation phase of a flight and the condition and effect of the attitude control system is shown below, in tabular form, to facilitate the understanding of the system operation:

| Programmer 40 Switch Position | Attitude Control System Condition | Function |
| --- | --- | --- |
| (1) | Powered flight, gyroscopes running. | Inactive. |
| (2) | End powered flight, deceleration switch operates. | Timer motor started. |
| (3) | Clockwise roll correction. | Despin vehicle. Timer motor 50 stopped. |
| (4) | Demodulator 54, 74 and 84 output sensed. | Erect vehicle to gyroscope heading. Timer motor 50 restarted. |
| (5) | Timer controlled advance. | Delay. |
| (6) | ...do... | Roll remote adjust correction. |
| (7) | ...do... | Pitch remote adjust correction. |
| (8) | ...do... | Yaw remote adjust correction. |
| (9) | ...do... | Delay. |
| (10) | ...do... | Roll maneuver. |
| (11) | ...do... | Pitch or yaw maneuver. |
| (12) | ...do... | Hold (first observation). |
| (13) | ...do... | Roll maneuver. |
| (14) | ...do... | Pitch or yaw maneuver. |
| (15) | ...do... | Hold (second observation). |
| (16) | ...do... | Roll maneuver. |
| (17) | ...do... | Pitch or yaw maneuver. |
| (18) | ...do... | Hold (third observation). |
| (19) | ...do... | Roll maneuver. |
| (20) | ...do... | Pitch or yaw maneuver. |
| (21) | ...do... | Hold (fourth observation). |
| (22) | ...do... | Roll maneuver. |
| (23) | ...do... | Pitch or yaw maneuver. |
| (24) | ...do... | Hold (fifth observation). |

These functions are all accomplished with basically a deceleration responsive switch, a timer, a programmer switch assembly, a pair of body mounted free gyroscopes, rate gyroscopes, gyroscope signal processing circuitry, reaction nozzles and associated solenoid valves. These components cooperate to provide a relatively simple effective system integrated into the vehicle without disturbing the aerodynamic design and capable of providing a high degree of pointing accuracy for the vehicle.

In the description of the system the programmer 40 is shown only in simplified form with only the necessary input and output connections shown in order to more clearly illustrate its function. In actuality it contains, in a typical installation, an eleven-wafer switch 40a, and at least 15 precision resistors, illustrated in the drawing as variable resistance elements 40b, to control the amplitude of program voltages applied to the leads 44, 45 and 46. Each of the internal connections from the power supply through the wafer switches 40a is replicated such that a full showing of the connections thereof would obscure an understanding of the operation of the system.

From the foregoing description the relative simplicity of the system of this invention can be recognized. The vehicle is spin stabilized during powered flight. At the end of powered flight the attitude control system is activated and using residual pressurization gas in the propellant system is capable of despinniing the vehicle, erecting it to a reference attitude and sequentially, under the control of a timer, make roll, pitch and yaw corrections for each of a number of different attitudes.

It is to be understood that the above described embodiments are merely illustrative of the application of the principles of my invention. Numerous other embodiments may be devised by one skilled in the art without departing from the spirit of this invention. The patent grant hereunder shall not be limited to the embodiments shown but rather by the scope of the following claims.

What is claimed is:

1. In combination with a ballistic vehicle having a propellant system, an attitude control system comprising:
    a pair of gyroscopes mounted in said vehicle each having an axis fixed parallel to the roll axis of the vehicle and each having a second axis normally mutually orthogonal to each other, and one of said gyroscopes having an axis parallel to the pitch axis and one of said gyroscopes having an axis parallel to the yaw axis of the vehicle;
    roll nozzle means positioned to expel gas from the vehicle tangentially to produce correction roll torque upon the vehicle;
    pitch nozzle means positioned to expel gas from the vehicle normal to the pitch axis of the vehicle;
    yaw nozzle means positioned to expel gas from the vehicle normal to the yaw axis of the vehicle;
    a supply of gas for said nozzle means;
    means for sequentially applying torquing signals to said gyroscope to introduce roll, pitch and yaw corrections into the vehicle orientation; and
    means responsive to the termination of powered flight of the vehicle for commencing operation of said last means.

2. The combination in accordance with claim 1 wherein said torque applying means includes a timer and switching means controlled by said timer for applying predetermined torquing signals to said gyroscopes in sequence to orient the vehicle.

3. The combination in accordance with claim 1 including valve means communicating from said gas supply to said nozzles, said valve means responsive to vehicle position deviation signals from said gyroscopes to control the emission of gas from said nozzle means.

4. The combination in accordance with claim 1 wherein said gas supply comprises the vehicle propellant system.

5. The combination in accordance with claim 1 wherein said attitude control system includes a cylindrical housing member constituting an extension of the vehicle, said roll nozzle means being positioned at the periphery of said cylindrical housing and operative to produce reaction torque upon said housing member and the vehicle upon the emissioin of gas therefrom.

6. The combination in accordance with claim 5 wherein said roll nozzle means comprises two pair of roll nozzles directed tangentially from the outer surface of the cylindrical housing, the nozzles of each pair positioned diametrically opposite and oppositely directed.

7. The combination in accordance with claim 1 wherein said pitch and yaw nozzle means are positioned orthogonally with respect to each other and to the roll axis of the vehicle at a position remote from the pitch and yaw axes of the vehicle.

8. The combination in accordance with claim 7 wherein said pitch and yaw nozzle means comprise two pair of radially directed oppositely positioned nozzles.

9. The combination in accordance with claim 8 wherein said vehicle has a fin assembly and said pitch and yaw nozzle pairs are positioned at the fin assembly of the vehicle.

References Cited by the Examiner
UNITED STATES PATENTS

| | | | |
|---|---|---|---|
| 2,949,785 | 8/1960 | Singleton et al. | 74—5.34 |
| 2,974,594 | 3/1961 | Boehm | 102—50 |
| 2,977,806 | 4/1961 | Lane | 74—5.34 |
| 3,058,304 | 10/1962 | Corbett | 60—35.55 |
| 3,093,346 | 6/1963 | Faget et al. | |
| 3,164,340 | 1/1965 | Slater et al. | 244—77 |

BENJAMIN A. BORCHELT, *Primary Examiner.*

V. R. PENDEGRASS, *Assistant Examiner.*